United States Patent
Wildgrube et al.

(10) Patent No.: US 11,042,750 B2
(45) Date of Patent: *Jun. 22, 2021

(54) REFUSE VEHICLE CONTROL SYSTEM

(71) Applicant: Oshkosh Corporation, Oshkosh, WI (US)

(72) Inventors: Grant Wildgrube, Faribault, MN (US); Zhenyi Wei, Oshkosh, WI (US); Cody D. Clifton, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,944

(22) Filed: Aug. 31, 2020

(65) Prior Publication Data

US 2020/0401807 A1 Dec. 24, 2020

Related U.S. Application Data

(63) Continuation of application No. 16/390,677, filed on Apr. 22, 2019.

(60) Provisional application No. 62/661,513, filed on Apr. 23, 2018.

(51) Int. Cl.
*B65F 3/04* (2006.01)
*G06K 9/00* (2006.01)

(52) U.S. Cl.
CPC .......... *G06K 9/00671* (2013.01); *B65F 3/041* (2013.01); *G06K 9/00805* (2013.01); *G06T 2207/10016* (2013.01)

(58) Field of Classification Search
None
See application file for complete search history.

(56) References Cited

U.S. PATENT DOCUMENTS 5,038,876 A * 8/1991 Smith .................... G01G 19/08
177/139
5,833,428 A * 11/1998 Szinte .......................... 414/408
5,919,027 A 7/1999 Christenson
(Continued)

FOREIGN PATENT DOCUMENTS

EP 2910497 * 2/2015 ................ B65F 3/04
WO WO2018/009961 * 1/2018 ................ B65F 3/00

OTHER PUBLICATIONS

Machine Translation of EP2910497 from espacenet. (Year: 2015).*

*Primary Examiner* — Mark C Hageman
(74) *Attorney, Agent, or Firm* — Foley & Lardner LLP

(57) ABSTRACT

A refuse vehicle includes a body coupled to a chassis and defining a refuse compartment configured to store refuse, a refuse collection arm configured to engage and lift a refuse container to unload refuse, and an object detection system configured to provide object detection data relating to locations of objects relative to the refuse vehicle. An actuator controls movement of the refuse collection arm. A controller is configured to use the object detection data to determine if the refuse container is present within an aligned zone relative to the chassis, the aligned zone representing a range of locations in which the refuse collection arm is capable of engaging the refuse container. In response to a determination that the refuse container is within the aligned zone, the controller is configured to provide an indication to an operator that the refuse container is within the aligned zone.

20 Claims, 12 Drawing Sheets

(56) References Cited

U.S. PATENT DOCUMENTS

| | | |
|---|---|---|
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,350,098 B1 | 2/2002 | Christenson et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,878,750 B2 | 2/2011 | Zhou et al. |
| 8,152,216 B2 | 4/2012 | Howell et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,630,773 B2 * | 1/2014 | Lee ............... G08B 13/196 701/45 |
| 8,807,613 B2 | 8/2014 | Howell et al. |
| 9,216,856 B2 | 12/2015 | Howell et al. |
| 9,387,985 B2 | 7/2016 | Gillmore et al. |
| 9,403,278 B1 * | 8/2016 | Van Kampen ............ G06T 7/12 |
| 9,579,969 B2 | 2/2017 | Crist et al. |
| 9,580,014 B2 * | 2/2017 | Lucas ................ G06K 9/00805 |
| 9,880,581 B2 | 1/2018 | Kuriakose et al. |
| 9,981,803 B2 | 5/2018 | Davis et al. |
| 10,106,032 B2 | 10/2018 | Crist et al. |
| 10,196,205 B2 | 2/2019 | Betz et al. |
| 10,633,180 B2 * | 4/2020 | Salinas ..................... B65F 3/02 |
| 10,633,181 B2 * | 4/2020 | Butcher ..................... B65F 3/00 |
| 2015/0159564 A1 | 6/2015 | Wildgrube et al. |
| 2016/0059690 A1 | 3/2016 | Wildgrube |
| 2018/0319642 A1 * | 11/2018 | Pronger ............ G06K 9/00805 |
| 2018/0346241 A1 * | 12/2018 | Errington ................ B65F 3/001 |
| 2019/0225422 A1 * | 7/2019 | Wrigley ................ B65F 3/045 |
| 2019/0325220 A1 * | 10/2019 | Wildgrube ......... G06K 9/00805 |
| 2020/0262366 A1 | 8/2020 | Wildgrube et al. |
| 2020/0265656 A1 | 8/2020 | Koga et al. |

\* cited by examiner

REFUSE VEHICLE CONTROL SYSTEM

CROSS-REFERENCE TO RELATED PATENT APPLICATION

This application is a continuation of U.S. application Ser. No. 16/390,677, filed Apr. 22, 2019, which claims the benefit of U.S. Provisional Application No. 62/661,513, filed Apr. 23, 2018, both of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

At least one embodiment relates to a refuse vehicle. The refuse vehicle includes a chassis extending longitudinally, a body coupled to the chassis and defining a refuse compartment configured to store refuse, a refuse collection arm configured to engage a refuse container and lift the refuse container to unload refuse from the refuse container, and an object detection system configured to provide object detection data relating to locations of objects relative to the refuse vehicle. The refuse collection arm includes an actuator configured to control movement of the refuse collection arm. A controller is operatively coupled to the object detection system and the actuator. The controller is configured to use the object detection data to determine if the refuse container is present within an aligned zone relative to the chassis, the aligned zone representing a range of locations in which the refuse collection arm is capable of engaging the refuse container. In response to a determination that the refuse container is within the aligned zone, the controller is configured to provide an indication to an operator that the refuse container is within the aligned zone.

Another embodiment relates to a refuse vehicle. The refuse vehicle includes a chassis extending longitudinally, a body coupled to the chassis and defining a refuse compartment configured to store refuse, a refuse collection arm configured to engage a refuse container and lift the refuse container to unload refuse from the refuse container, and an object detection system configured to provide object detection data relating to locations of objects relative to the refuse vehicle. The refuse collection arm includes an actuator configured to control movement of the refuse collection arm. A controller is operatively coupled to the object detection system and the actuator. In response to an indication from the object detection system that an object is present near the refuse vehicle, the controller is configured to use the object detection data to determine if the object is an obstacle or a refuse container. In response to a determination that the object is an obstacle, the controller is configured to at least one of (a) provide an indication to an operator that the obstacle is present near the refuse vehicle and (b) limit a movement of the refuse vehicle.

Another embodiment relates to a control system for a refuse vehicle including a refuse collection arm. The control system includes a location sensor configured to provide data relating to at least one of a position and an orientation of the refuse collection arm, an actuator configured to control movement of the refuse collection arm, a display, and a controller operatively coupled to the location sensor, the actuator, and the display. The controller is configured to use the data from the location sensor to generate a model of the refuse collection arm. The display is configured to display the model generated by the controller.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
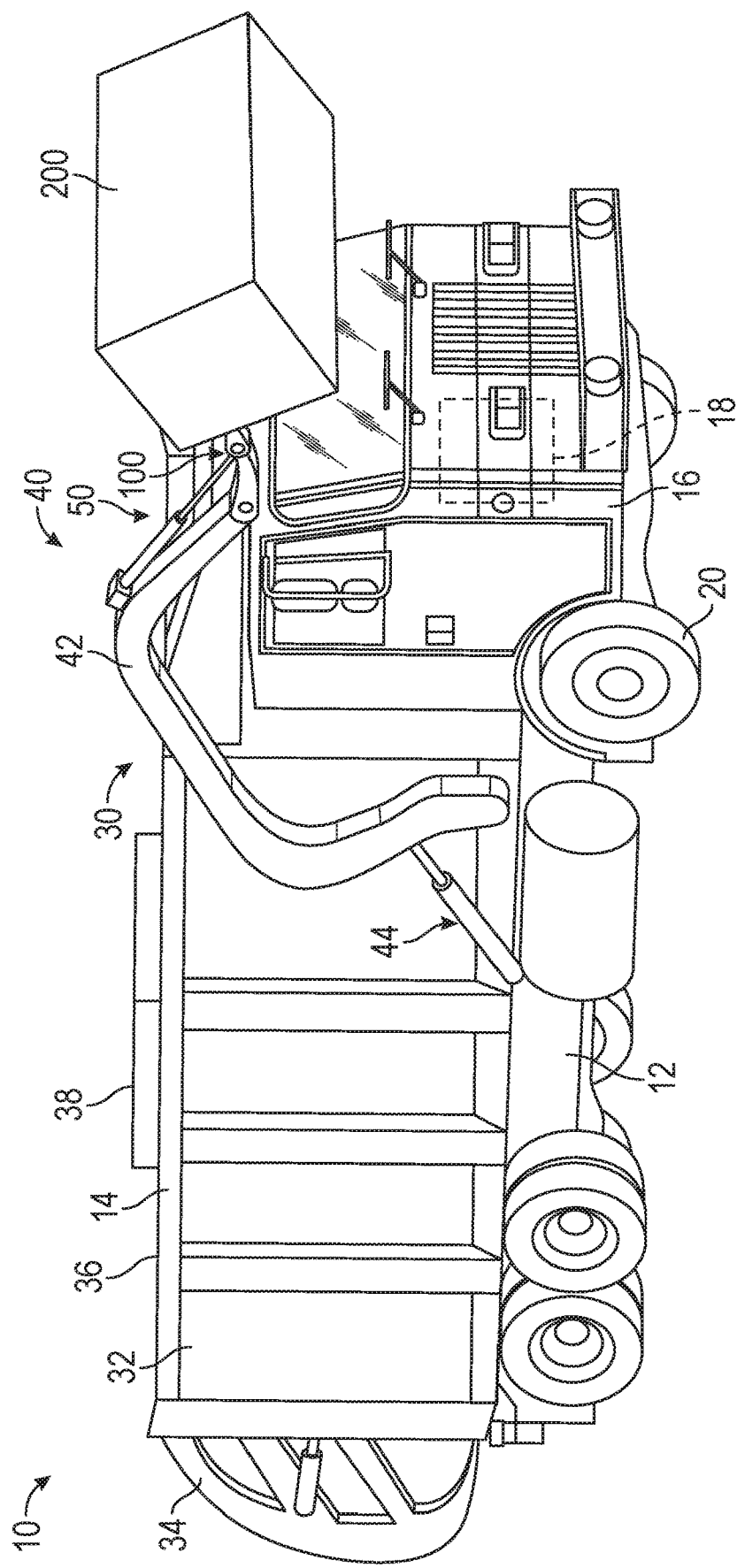
FIG. 1 is a perspective view of a front-loading refuse vehicle, according to an exemplary embodiment.

According to the exemplary embodiment shown in FIG. 1, a vehicle, shown as refuse vehicle 10 (e.g., a garbage truck, a waste collection truck, a sanitation truck, etc.), is configured as a front-loading refuse truck. According to the exemplary embodiment shown in FIG. 2, the refuse vehicle 10 is shown as a side-loading refuse truck. In other embodiments, the refuse vehicle 10 is configured as a rear-loading refuse truck. In still other embodiments, the vehicle is another type of vehicle (e.g., a skid-loader, a telehandler, a plow truck, a boom lift, a concrete mixer, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The frame 12 extends longitudinally (i.e., along a direction of travel of the vehicle 10). A lateral direction is defined perpendicular to the longitudinal direction. The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover or primary driver (e.g., an engine, an electric motor, etc.), shown as engine 18, coupled to the frame 12 at a position beneath the cab 16. The engine 18 is configured to provide power to tractive elements, shown as wheels 20, and/or to other systems of the refuse vehicle 10 (e.g., a pneumatic system, a hydraulic system, an electrical system, etc.). The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, solar panels, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a series of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiments shown in FIGS. 1 and 2, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position within the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes a first lift mechanism/system (e.g., a front-loading lift assembly, etc.), shown as lift assembly 40. The lift assembly 40 includes a pair of arms, shown as lift arms 42, coupled to the frame 12 and/or the body 14 on either side of the refuse vehicle 10 such that the lift arms 42 extend forward of the cab 16 (e.g., a front-loading refuse vehicle, etc.). In other embodiments, the lift assembly 40 extends rearward of the body 14 (e.g., a rear-loading refuse vehicle, etc.). The lift arms 42 may be rotatably coupled to frame 12 with a pivot (e.g., a lug, a shaft, etc.). As shown in FIG. 1, the lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment.

Figure 3:
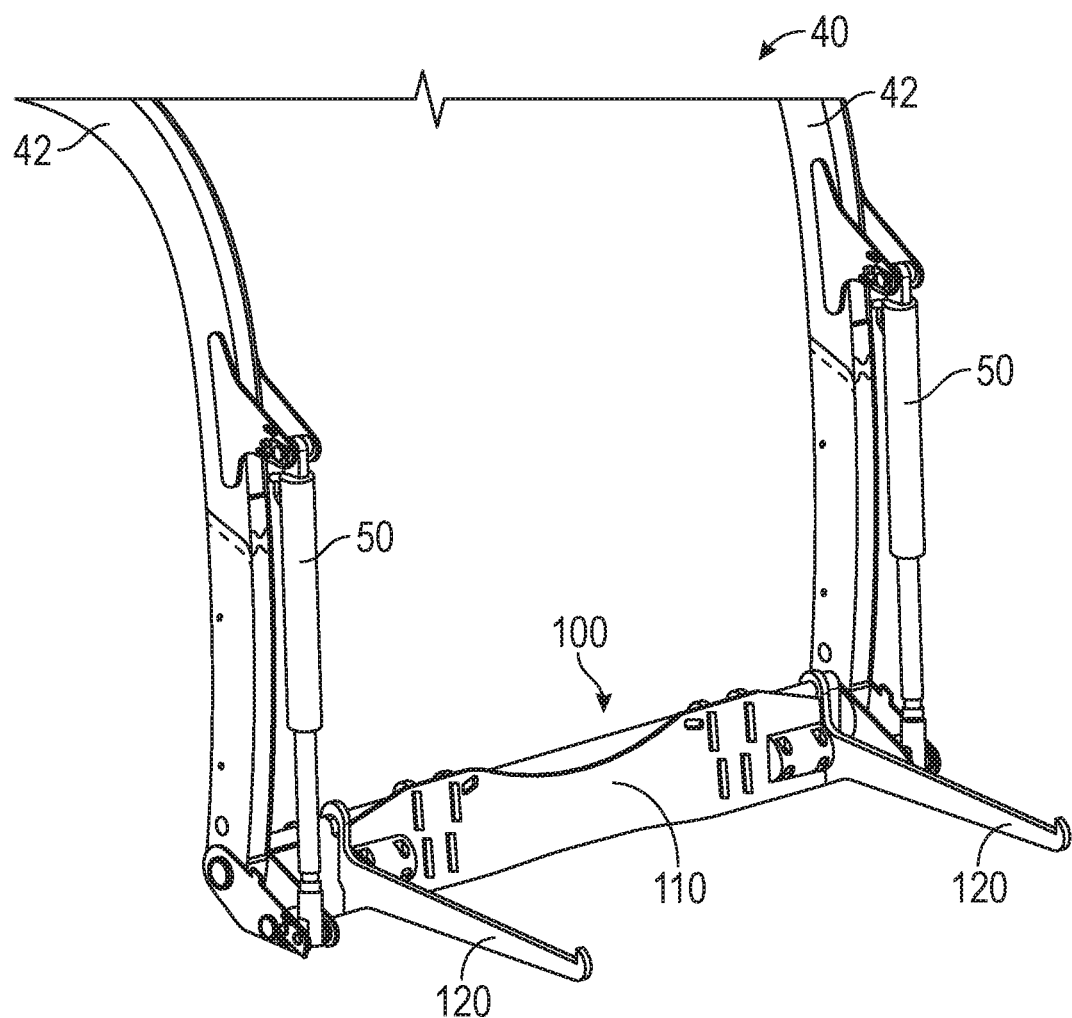
FIG. 3 is a perspective view of a lift assembly of the front-loading refuse vehicle of FIG. 1.

As shown in FIGS. 1 and 3, a fork assembly 100 is coupled to the lift arms 42 of the lift assembly 40. The fork assembly 100 includes a plate, shown as fork plate 110, and a pair of forks, shown as forks 120. According to an exemplary embodiment, the forks 120 are coupled (e.g., attached, fastened, welded, etc.) to the fork plate 110. The forks 120 may have a generally rectangular cross-sectional shape and are configured to engage a refuse container (e.g., protrude through fork pockets of a commercial refuse container, a carry can, the container assembly 200, etc.). During operation of the refuse vehicle 10, the forks 120 are positioned to engage the refuse container (e.g., the refuse vehicle 10 is driven into position such that the forks 120 protrude through fork pockets within the refuse container, etc.).

Figure 2:
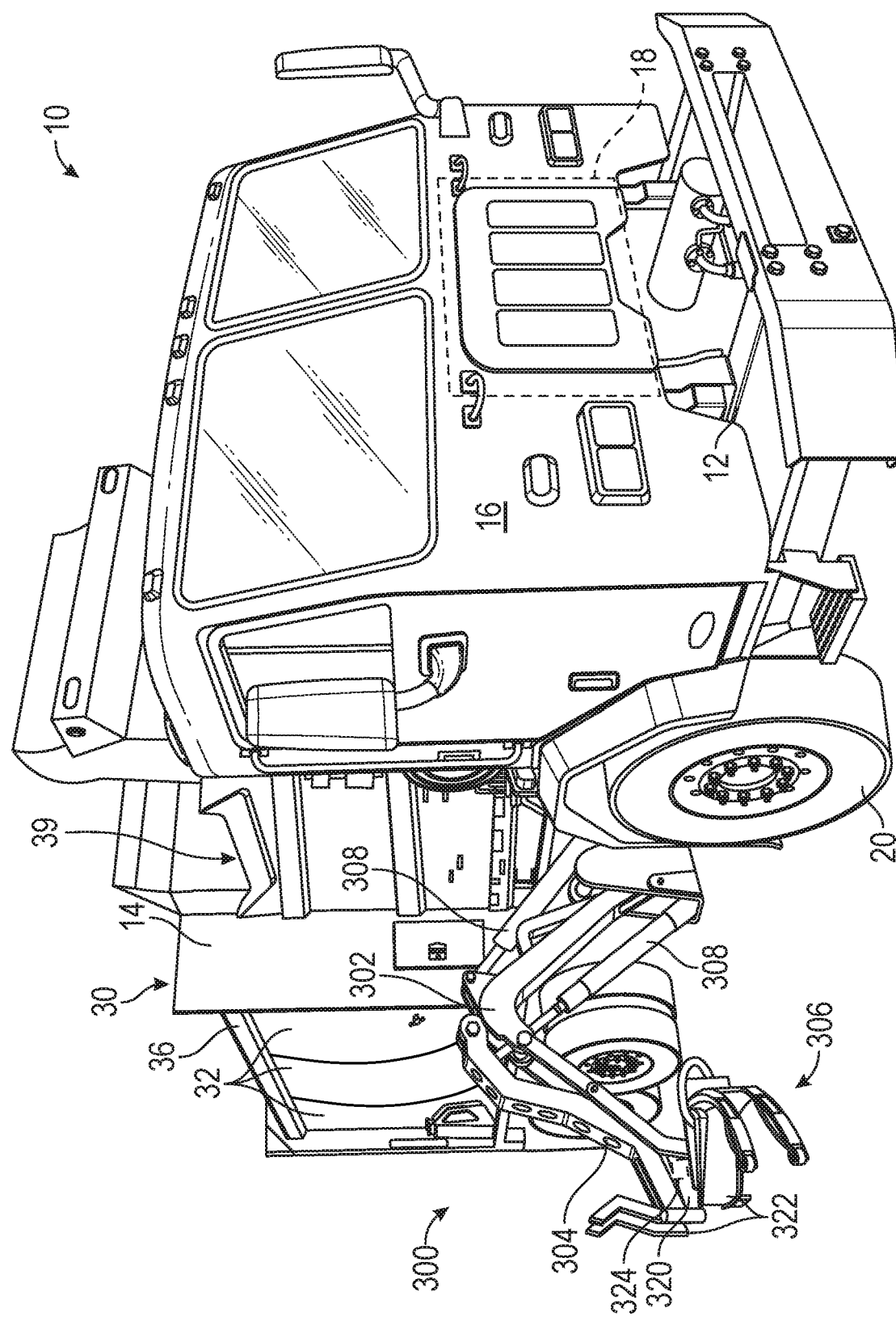
FIG. 2 is a perspective view of a side-loading refuse vehicle, according to an exemplary embodiment.

As shown in FIG. 1, the lift arms 42 are rotated by the lift arm actuators 44 to lift the forks 120 and the refuse container over the cab 16. As shown in FIGS. 1 and 3, the lift assembly 40 includes second actuators, shown as articulation actuators 50 (e.g., hydraulic cylinders, etc.). According to an exemplary embodiment, the articulation actuators 50 are positioned to articulate the fork assembly 100 relative to the lift arms 42. Such articulation may assist in tipping refuse out of the refuse container (e.g., coupled to the lift assembly 40 by the fork assembly 100, etc.) and into the hopper volume of the refuse compartment 30 through an opening in the cover 36. The lift arm actuators 44 may thereafter rotate the lift arms 42 to return the refuse container to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.). As shown in FIG. 2, the body 14 defines an opening 39 through which refuse may be added to the refuse compartment 30.

Figure 4:
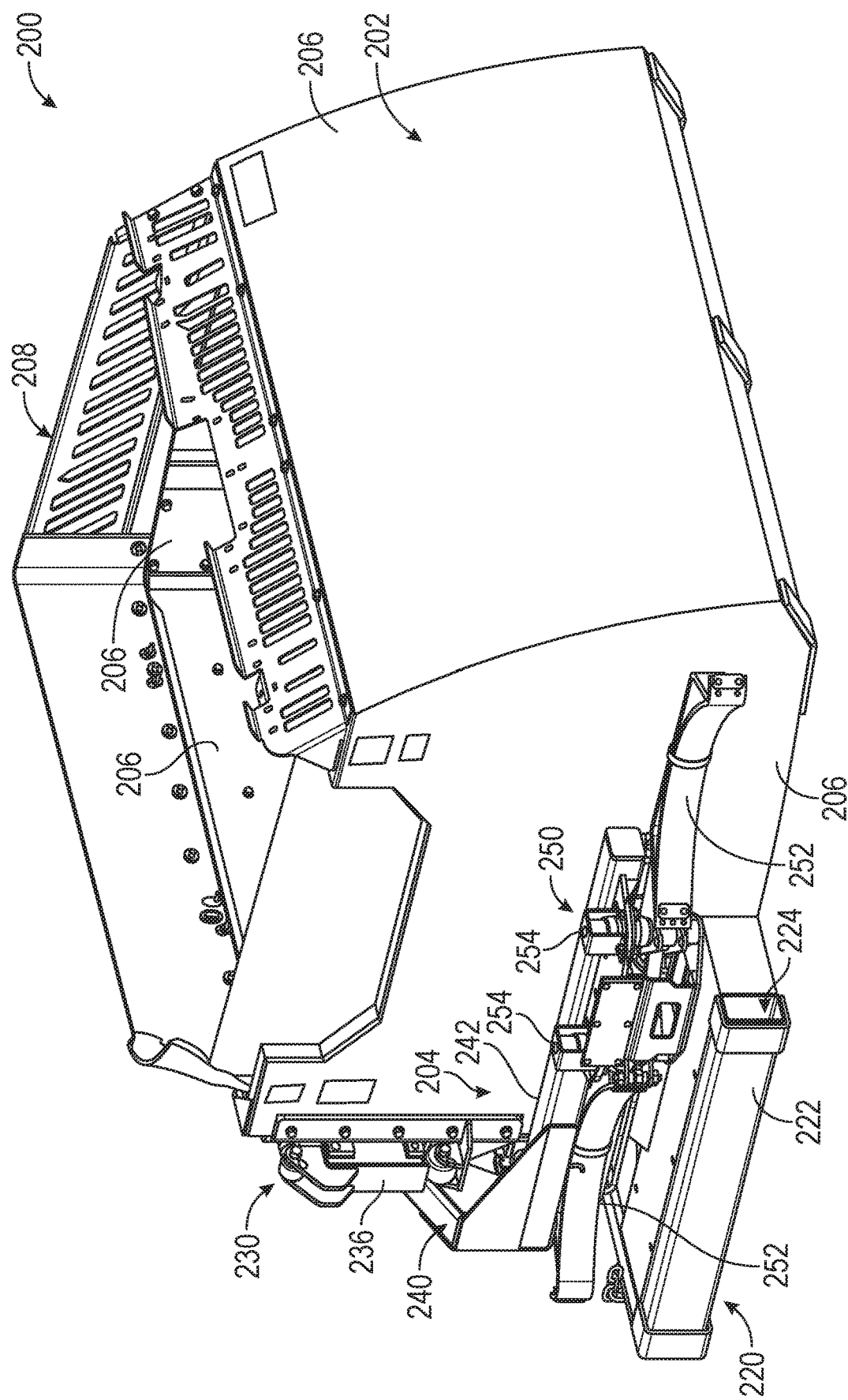
FIG. 4 is a front perspective view of a front-loading refuse container assembly, according to an exemplary embodiment.
Figure 5:
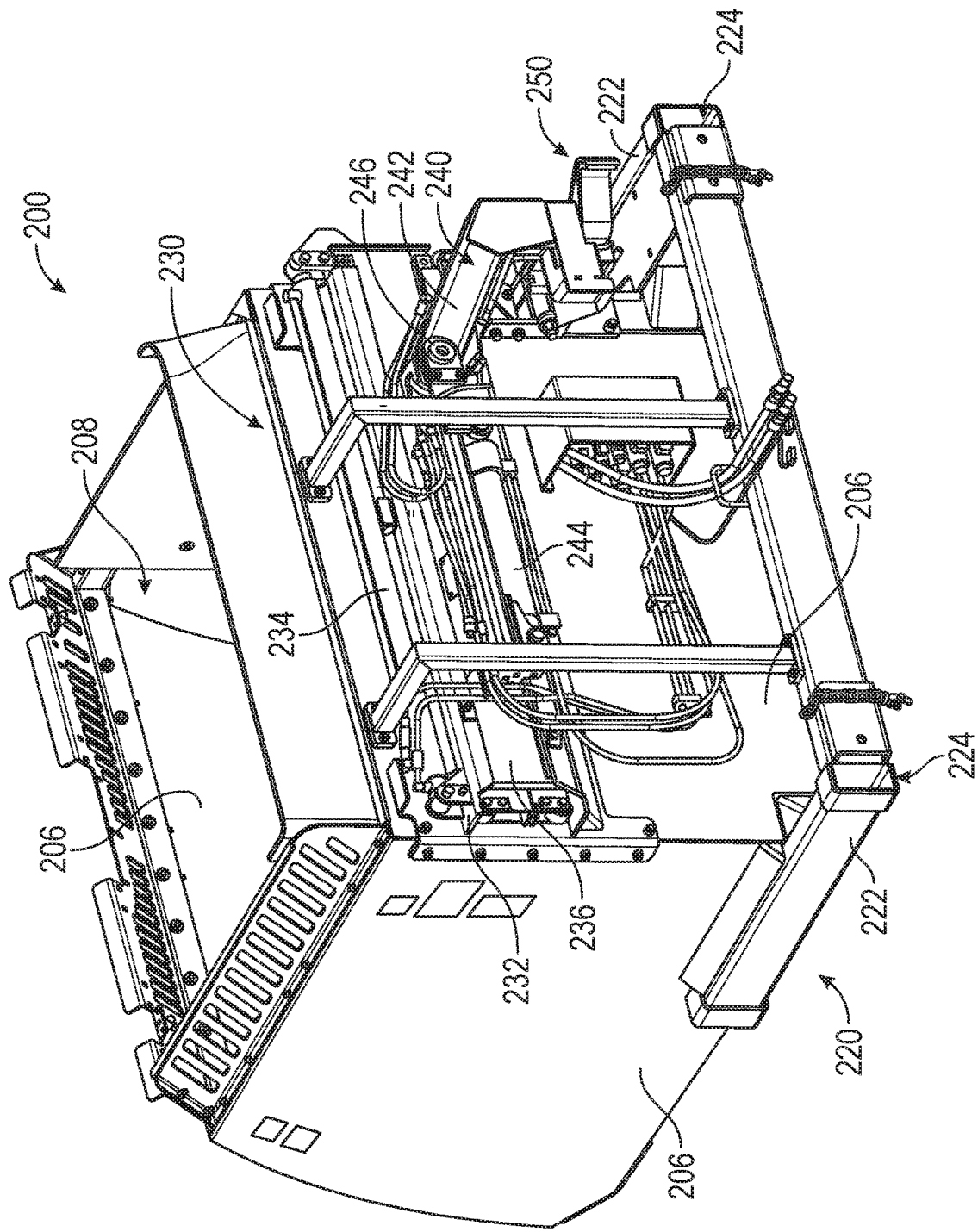
FIG. 5 is a rear perspective view of the front-loading refuse container assembly of FIG. 4.

As shown in FIG. 1, the fork assembly 100 is configured to selectively couple to a front-loading refuse container assembly, shown as container assembly 200. The container assembly 200 includes a container, shown as refuse container 202, and a refuse collection arm assembly, shown as collection arm assembly 204. As shown in FIGS. 4 and 5, the refuse container 202 includes a series of walls 206 that cooperatively define an internal cavity or volume, shown as container refuse compartment 208. According to an exemplary embodiment, the container refuse compartment 208 is configured to receive refuse from the collection arm assembly 204.

Referring to FIGS. 4 and 5, the refuse container assembly 200 includes an interface, shown as fork interface 220. The fork interface 220 includes a pair of interface portions, shown as fork interfaces 222, positioned along opposing walls 206. Each fork interface 222 defines a pocket, recess, chamber, or volume, shown as fork pocket 224. According to an exemplary embodiment, the fork pockets 224 are configured to receive the forks 120 of the refuse vehicle 10. The lift assembly 40 may thereby be configured to lift the container assembly 200 to empty the refuse within the container refuse compartment 208 of the refuse container 202 into the refuse compartment 30 of the refuse vehicle 10. In other embodiments, the fork assembly 100 is omitted, and the container assembly 200 is directly coupled to the lift arms 42 and the articulation actuators 50.

The collection arm assembly 204 is coupled to a rear wall 206 of the refuse container 202. The collection arm assembly 204 includes a first portion, shown as translatable portion 230, a second portion, shown as rotatable portion 240, and a third portion, shown as grabber assembly 250. The translatable portion 230 of the collection arm assembly 204 includes a carriage assembly, shown as slide track 232, a first actuator (e.g., pneumatic actuator, hydraulic actuator, electric actuator, etc.), shown as translation actuator 234, and a slideable member, shown as slide assembly 236. As shown in FIG. 4, the slide track 232 is coupled (e.g., fastened, welded, etc.) to the rear wall 206 of the refuse container 202. According to an exemplary embodiment, the slide assembly 236 is slidably coupled to the slide track 232. The translation actuator 234 is positioned to facilitate selectively extending and retracting the slide assembly 236 relative to the slide track 232 such that the grabber assembly 250 of the collection arm assembly 204 may extend laterally outward from the refuse container 202 and retract laterally inward toward the refuse container 202, according to an exemplary embodiment.

The rotatable portion 240 of the collection arm assembly 204 includes an arm, shown as rotatable arm 242, and a second actuator (e.g., pneumatic actuator, hydraulic actuator, electric actuator, etc.), shown as lift actuator 244. The rotatable arm 242 is pivotally coupled to the slide assembly 236 and rotates about a joint, shown as pivot 246, extending along a longitudinal axis. The grabber assembly 250 is coupled to an end of the rotatable arm 242 (e.g., opposite the pivot 246, etc.). Specifically, the grabber assembly 250 includes a pair of can interface members, shown as claws 252, that are pivotally coupled to the rotatable arm 242. A pair of third actuators (e.g., pneumatic actuators, hydraulic actuators, electric actuators, etc.), shown as grabbing actuators 254, are coupled to the rotatable arm 242 and the claws 252. The grabbing actuators 254 are configured to pivot the claws 252 about substantially vertical axes toward or away from one another to close or open the grabber assembly 250, respectively. According to an exemplary embodiment, the grabber assembly 250 is configured to selectively open and close to engage and release a refuse bin. The lift actuator 244 is positioned to facilitate selectively pivoting the rotatable arm 242 and the grabber assembly 250 about the pivot 246, according to an exemplary embodiment. The collection arm assembly 204 may thereby facilitate engaging a refuse bin (e.g., positioned at a curb of a driveway, etc.) to deposit refuse from the refuse bin into the container refuse compartment 208 of the refuse container 202.

In the embodiment shown in FIG. 2, the refuse vehicle 10 is a side-loading refuse vehicle and includes a second lift mechanism/system (e.g., a side-loading lift assembly, etc.) or refuse collection arm, shown as lift assembly 300. The lift assembly 300 includes a first arm, shown as lift arm 302. A proximal end of the lift arm 302 is pivotally coupled to the frame 12 and/or the body 14 such that the lift arm 302 pivots about a first longitudinal axis. A second arm, shown as lift arm 304, is pivotally coupled to a distal end of the lift arm 302 such that the lift arm 304 pivots about a second longitudinal axis. A grabber assembly 306 is pivotally coupled to a distal end of the lift arm 304 (e.g., opposite the lift arm 302, etc.). A pair of actuators (e.g., pneumatic actuators, hydraulic actuators, electric actuators, etc.), shown as lift arm actuators 308, are coupled to the frame 12 and the lift arm 302 or the lift arm 304 (e.g., directly, indirectly through one or more linkages, etc.). The lift arm actuators 308 are configured to extend and retract to move the lift arm 302, the lift arm 304, and the grabber assembly 306 relative to the frame 12 and the body 14. Specifically, extension and retraction of one of the lift arm actuators 308 may move the grabber assembly 306 primarily laterally relative to the frame 12 and the body 14. Extension and retraction of the other of the lift arm actuators 308 may move the grabber assembly 306 primarily vertically relative to the frame 12 and the body 14. The grabber assembly 306 may be coupled to the lift arm 302 and/or the lift arm 304 through one or more linkages (e.g., forming a four bar linkage) such that the orientation of the grabber assembly 306 is dependent on the orientation of the lift arm 302 and/or the lift arm 304.

The grabber assembly 306 includes a grabber base 320 pivotally coupled to the lift arm 304. A pair of can interface members, shown as claws 322, are pivotally coupled to the grabber base 320. A second actuator (e.g., pneumatic actuator, hydraulic actuator, electric actuator, etc.), shown as grabbing actuator 324, is coupled to the grabber base 320 and the claws 322. The grabbing actuator 324 is configured to pivot the claws 322 (e.g., about substantially vertical axes as shown in FIG. 2) toward or away from one another to close or open the grabber assembly 306, respectively. According to an exemplary embodiment, the grabber assembly 306 is configured to selectively open and close to engage and release a refuse bin. The lift assembly 300 may thereby facilitate engaging a refuse bin (e.g., positioned at a curb of a driveway, etc.) to deposit refuse from the refuse bin into the refuse compartment 30.

Figure 6:
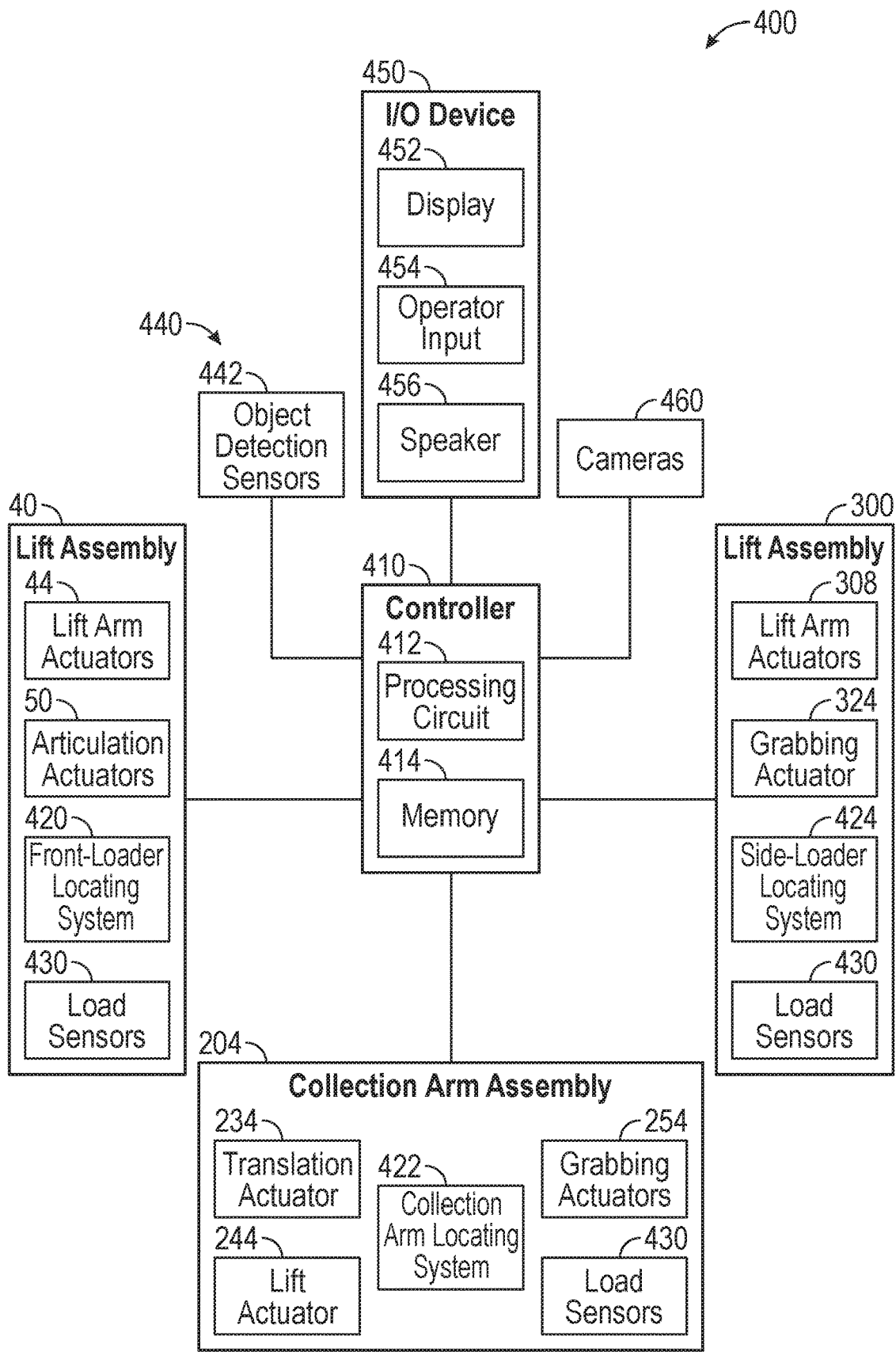
FIG. 6 is a block diagram of a control system for a refuse vehicle, according to an exemplary embodiment.

According to the exemplary embodiment shown in FIG. 6, a refuse vehicle control system, shown as control system 400, for the refuse vehicle 10 includes a controller 410. In one embodiment, the controller 410 is configured to selectively engage, selectively disengage, control, and/or otherwise communicate with components of the refuse vehicle 10. By way of example, the controller 410 may observe the operation of the refuse vehicle 10, control one or more subsystems, receive inputs from an operator, and provide information to an operator. As shown in FIG. 6, the controller 410 is operatively coupled (e.g., through a pump and/or valves) to the lift arm actuators 44, the articulation actuators 50, the translation actuator 234, the lift actuator 244, the grabbing actuators 254, the lift arm actuators 308, and/or the grabbing actuator 324 throughout various embodiments to control movement of the lift assembly 40, the collection arm assembly 204, and the lift assembly 300. In other embodiments, the controller is coupled to more or fewer components.

The controller 410 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 6, the controller 410 includes a processing circuit 412 and a memory 414. The processing circuit 412 may include an ASIC, one or more FPGAs, a DSP, circuits containing one or more processing components, circuitry for supporting a microprocessor, a group of processing components, or other suitable electronic processing components. In some embodiments, the processing circuit 412 is configured to execute computer code stored in the memory 414 to facilitate the activities described herein. The memory 414 may be any volatile or non-volatile computer-readable storage medium capable of storing data or computer code relating to the activities described herein. According to an exemplary embodiment, the memory 414 includes computer code modules (e.g., executable code, object code, source code, script code, machine code, etc.) configured for execution by the processing circuit 412. In some embodiments, the controller 410 represents a collection of processing devices (e.g., servers, data centers, etc.). In such cases, the processing circuit 412 represents the collective processors of the devices, and the memory 414 represents the collective storage devices of the devices.

The control system 400 further includes a first position sensor system, shown as front-loader locating system 420, a second position sensor system, shown as collection arm locating system 422, and a third position sensor system, shown as side-loader locating system 424, operatively coupled to the controller 410. The front-loader locating system 420, the collection arm locating system 422, and the side-loader locating system 424 may each include one or more of the following sensors: linear position sensors (e.g., linear variable differential transformers, linear potentiometers, linear encoders, magnetostrictive sensors, etc.), angular position sensors (e.g., rotary potentiometers, rotary encoders, etc.), accelerometers, gyroscopic sensors, or other types of sensors that provide information (e.g., data) regarding the position and/or orientation of an object. The controller 410 is configured to use information from the front-loader locating system 420, the collection arm locating system 422, and the side-loader locating system 424 to determine the position and/or orientation of the lift assembly 40, the collection arm assembly 204, and the lift assembly 300 relative to the frame 12 and/or body 14. Various geometric relationships throughout the refuse vehicle 10 may be predetermined and stored in the memory 414 to facilitate this determination. By way of example, the ratio between the length of the articulation actuators 50 and the angle between the lift arms 42 and the fork assembly 100 may be predetermined and stored in the memory 414.

The controller 410 is configured to use information from the front-loader locating system 420 to determine the position and/or orientation of the lift arms 42 and/or the fork assembly 100 relative to the frame 12 and/or body 14. By way of example, one or more of the lift arm actuators 44 and the articulation actuators 50 may include a linear position sensor that provides information relating to the length of each actuator. The controller 410 may use these lengths to determine the orientation of the fork assembly 100 relative to the lift arms 42 and the orientation of the lift arms 42 relative to the frame 12 and/or body 14. Alternatively, the front-loader locating system 420 may include angular position sensors that provide the orientation of the fork assembly 100 relative to the lift arms 42 and the orientation of the lift arms 42 relative to the frame 12 and/or body 14 directly.

The controller 410 is configured to use information from the collection arm locating system 422 to determine the position and/or orientation of the slide track 232, the rotatable arm 242, and/or the claws 252 relative to the refuse container 202. By way of example, the collection arm locating system 422 may include linear position sensors that provide information relating to the lengths of the translation actuator 234 and the lift actuator 244. The controller 410 may use these lengths to determine the position and orientation of the rotatable arm 242 relative to the refuse container 202. Alternatively, the collection arm locating system 422 may include an angular position sensor that provides the orientation of the rotatable arm 242 relative to the slide track 232 directly. The collection arm locating system 422 may additionally include linear or angular position sensors that provide information relating to the orientations of the claws 252 relative to the rotatable arm 242. Using the position and/or orientation of the slide track 232, the rotatable arm 242, and/or the claws 252 relative to the refuse container 202 and the position and/or orientation of the fork assembly 100 relative to the frame 12 and/or body 14, the controller 410 may be configured to determine the position and/or orientation of the slide track 232, the rotatable arm 242, and/or the claws 252 relative to the frame 12 and/or the body 14.

The controller 410 is configured to use information from the side-loader locating system 424 to determine the position and/or orientation of the lift arm 302, the lift arm 304, and the claws 322 relative to the frame 12 and/or body 14. By way of example, the lift arm actuators 308 may include linear position sensors that provide information relating to the lengths of the lift arm actuators 308. The controller 410 may use these lengths to determine the orientation of the grabber base 320 relative to the lift arm 304, the orientation of the lift arm 304 relative to the lift arm 302 and the orientation of the lift arm 302 relative to the frame 12 and/or body 14. Alternatively, the side-loader locating system 424 may include angular position sensors that provide the orientation of the grabber base 320 relative to the lift arm 304, the orientation of the lift arm 304 relative to the lift arm 302, and the orientation of the lift arm 302 relative to the frame 12 and/or the body 14 directly. The side-loader locating system 424 may additionally include linear or angular position sensors that provide information relating to the orientations of the claws 322 relative to the grabber base 320.

The control system 400 may further include load sensors (e.g., pressure sensors, strain gauges, etc.), shown as load sensors 430, coupled to one or more of the actuators and/or structural elements of the refuse vehicle 10 (e.g., the lift arm 302) and operatively coupled to the controller 410. The load sensors 430 are configured to provide information indicative of an output force of the corresponding actuator and/or a weight or load supported by the corresponding refuse collection arm. By way of example, one or more of the lift arm actuators 44, the articulation actuators 50, the translation actuator 234, the lift actuator 244, the grabbing actuators 254, the lift arm actuators 308, and the grabbing actuator 324 may be hydraulic cylinders. The load sensors 430 may be hydraulic pressure sensors fluidly coupled to the hydraulic cylinders and configured to provide a pressure of the hydraulic fluid within an extension chamber or a retraction chamber of the corresponding hydraulic cylinder. The controller 410 may be configured to use this pressure along with the geometry of the hydraulic cylinder (e.g., a surface area of a piston) stored in the memory 212 to determine an output force of the hydraulic cylinder. In such an embodiment, the load sensor 430 may be located within a directional control valve that controls the direction of movement of each actuator. The directional control valve may be configured such that the load sensor 430 is automatically fluidly coupled to whichever chamber of the hydraulic cylinder is pressurized. In other embodiments, the load sensor 430 is another type of sensor capable of measuring a load, such as a pneumatic pressure sensor or a strain gage.

Referring to FIGS. 6-12, the control system 400 may further include an imaging system or distance sensing system, shown as object detection system 440, operatively coupled to the controller 410. The object detection system 440 includes one or more distance, shape, or imaging sensors, shown as object detection sensors 442, such as radar systems, LIDAR systems, ultrasonic sensors, camera imaging systems, and/or other types of sensors. The object detection sensors 442 are configured to provide object detection data relating to the position and/or orientation of an object (e.g., a refuse container, a pedestrian, a mail box, a bicycle, a tree, etc.) relative to the body 14, the collection arm assembly 204, and/or the lift assembly 300. In some embodiments, the object detection sensors 442 are each configured to indicate whether or not an object is present within a range of locations 444 (e.g., a range of lateral, longitudinal, and/or vertical locations) relative to the body 14, the collection arm assembly 204, and/or the lift assembly 300. The boundaries of the range of locations 444 may correspond to the limits of what the object detection system 440 is capable of detecting. In other embodiments, the object detection sensors 442 are configured to provide the location of an object within the range of locations 444 relative to the body 14, the collection arm assembly 204, and/or the lift assembly 300. In some embodiments, the object detection sensors 442 provide the locations of multiple points along the surface of the object such that a shape of the object may be determined by the controller 410.

The object detection sensors 442 may be positioned on the body 14 or on the refuse container 202 such that the range of locations 444 contains an area in which the collection arm assembly 204 or the lift assembly 300 can reach a refuse container. Alternatively, the object detection sensors 442 may be positioned such that the range of locations 444 covers areas that are likely to contain objects that may collide with the refuse vehicle and/or that are minimally visible to an operator located in the cab 16. By way of example, the range of locations 444 may cover a blind spot of the refuse vehicle 10 or may extend behind or above the refuse vehicle 10. The size and shape of the range of locations 444 may correspond to the physical limitations of the object detection sensor 442. Alternatively, the size and shape of the range of locations 444 may be limited to a desired range.

Figure 13:
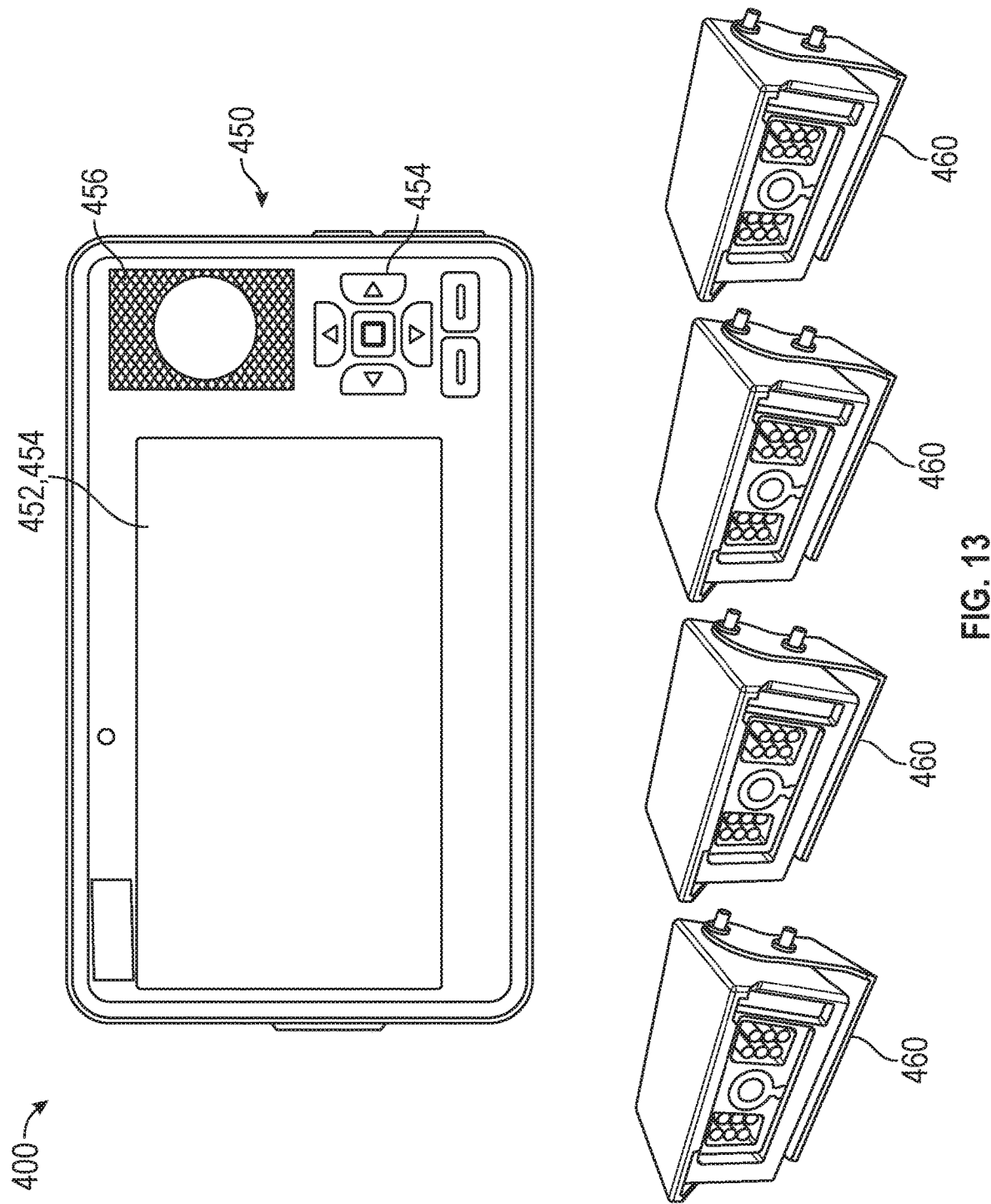
FIG. 13 is a perspective view of an I/O device and cameras of the control system of FIG. 6.

Referring to FIGS. 6 and 13, the control system 400 further includes an operator interface, shown as input/output "I/O" device 450, operably coupled to the controller 410. The I/O device 450 is configured to receive commands from an operator and provide information to the operator. The I/O device 450 includes a display 452 and an operator input 454. The display 452 may be configured to display a graphical user interface, an image, a video, an icon, and/or still other information. In some embodiments, the display 452 is a touchscreen such that the display also acts as an operator input 454. In one embodiment, the display 452 includes a graphical user interface configured to provide general information about the refuse vehicle 10 (e.g., vehicle speed, fuel level, warning lights, battery level, etc.). The operator input 454 may include buttons, switches, knobs, joysticks, microphones, or other user input devices. The I/O device 450 further includes an auditory output device, shown as speaker 456, that is configured to provide auditory cues or indications (e.g., sound signals) to the operator. The I/O device 450 may be or include a user interface within the cab 16, a user interface on the side of the body 14, and/or a portable device wirelessly connected to the controller 410 (e.g., a mobile device, a smartphone, a tablet, etc.).

Referring again to FIGS. 6 and 13, the control system 400 further includes a series of sensors, shown as cameras 460, that are operably coupled to the controller 410. In some embodiments, the cameras 460 are part of the object detection system 440. The cameras 460 are configured to record video in various locations (e.g., of various areas) around the refuse vehicle 10. The recorded videos are provided to the display 452 through the controller 410, and the display 452 displays the recorded videos in real time. The cameras 460 may be located such that the displayed video shows the operator areas that would not otherwise be visible from the cab 16. By way of example, the cameras 460 may show a blind spot of the refuse vehicle 10 or show an area directly behind the refuse vehicle 10. By way of another example, the view of one of the cameras 460 may be directly aligned with the collection arm assembly 204 or the lift assembly 300, facilitating alignment of the grabber assembly 250 or the grabber assembly 306 with a refuse container.

Figure 7:
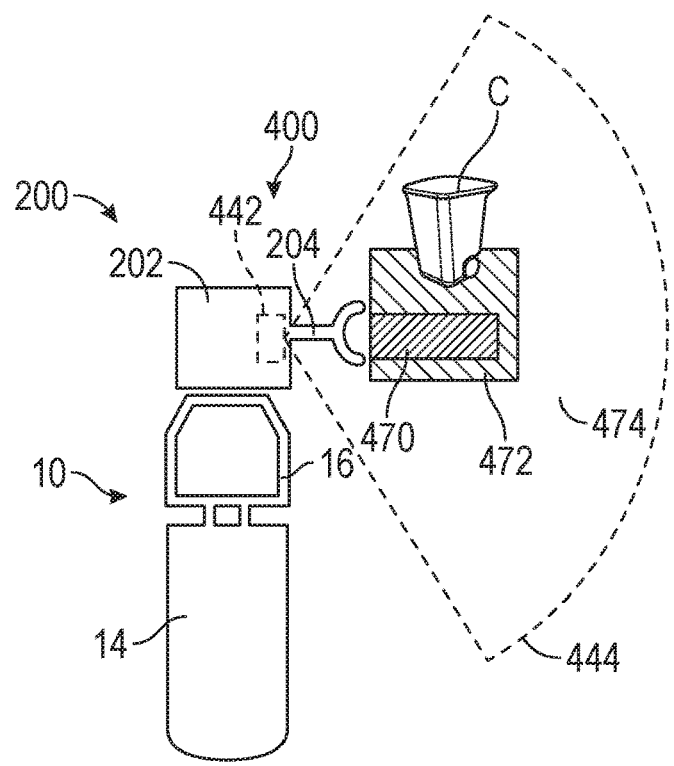
FIGS. 7 and 8 are top views of a front-loading refuse vehicle and a front-loading refuse container assembly, according to an exemplary embodiment.
Figure 8:
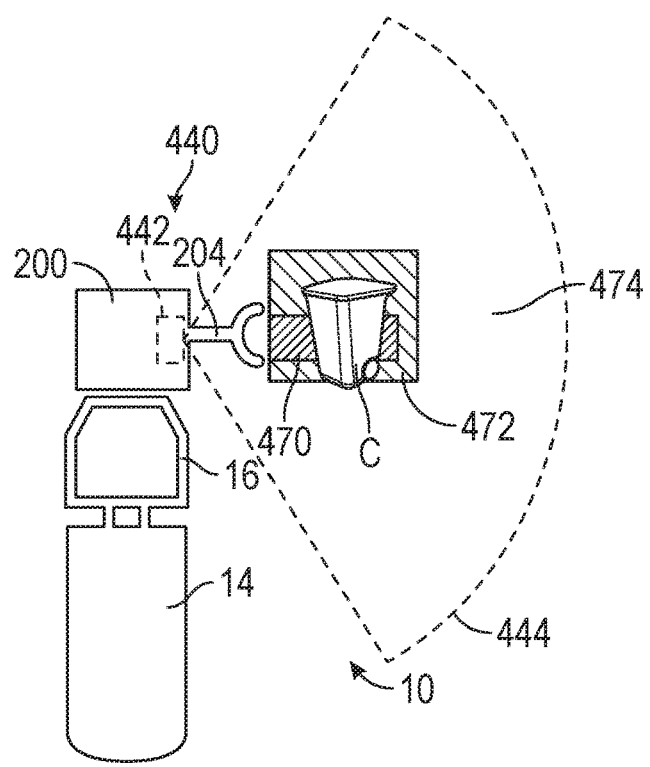
Figure 9:
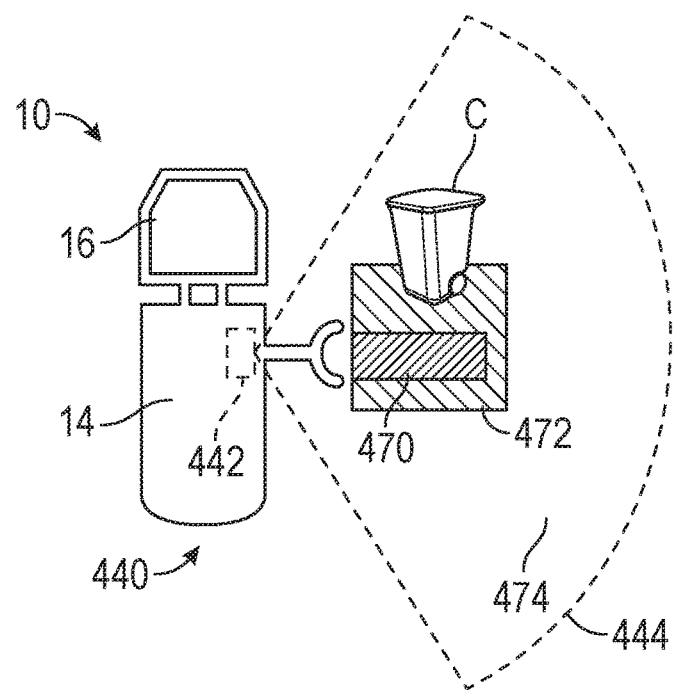
FIGS. 9 and 10 are top views of a side-loading refuse vehicle, according to an exemplary embodiment.
Figure 10:
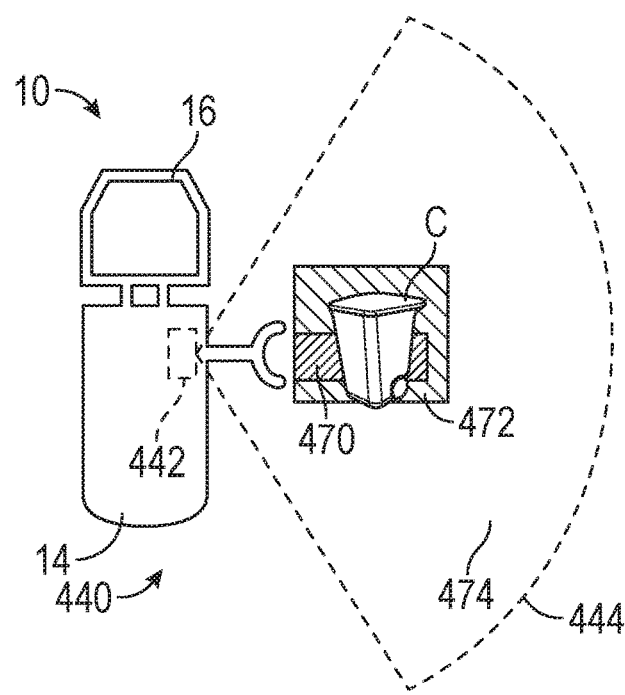

In some embodiments, the control system 400 is configured to facilitate alignment of the collection arm assembly 204 or the lift assembly 300 with a refuse container C (e.g., a bin, a dumpster, etc.), thereby reducing the time required to retrieve the refuse from the refuse container C relative to a conventional refuse vehicle. In FIGS. 7 and 8, the refuse vehicle 10 includes the container assembly 200, and the control system 400 is configured to facilitate alignment of the collection arm assembly 204 with the refuse container C. In FIGS. 9 and 10, the refuse vehicle 10 includes the lift assembly 300, and the control system 400 is configured to facilitate alignment of the lift assembly 300 with the refuse container C.

When retrieving refuse in a residential setting, each customer places their refuse containers C filled with refuse along the side of a road prior to arrival of the refuse vehicle 10. The operator drives the refuse vehicle 10 along the road until a refuse container C is positioned along the lateral side of the refuse vehicle 10. When collecting the refuse containers C, the controller 410 communicates with the object detection system 440. The controller 410 may begin communication with the object detection system 440 automatically or in response to an operator input (e.g., through the I/O device 450). Once the refuse container C passes into the range of locations 444, the object detection system 440 begins determining the location of the refuse container C relative to the refuse vehicle 10. Specifically, the object detection system 440 and the controller 410 may cooperate to determine a lateral position and a longitudinal position of the refuse container C relative to the refuse vehicle 10.

In some embodiments, the controller 410 is configured to determine when the refuse container C passes into various zones or areas. In FIGS. 7-10, the controller 410 defines three zones or areas: a first zone or area, shown as aligned zone 470, a second zone or area, shown as intermediate zone 472, and a third zone or area, shown as misaligned zone 474. The aligned zone 470 represents the range of locations of the refuse container C where the collection arm assembly 204 or the lift assembly 300 can successfully engage and manipulate the refuse container C. The intermediate zone 472 surrounds (e.g., partially, completely, etc.) and is adjacent to the aligned zone 470 and represents a range of locations where the collection arm assembly 204 or the lift assembly 300 are unable to engage the refuse container C, but where the refuse container C can be reached with minor adjustment of the location of the refuse vehicle 10 (e.g., driving a short distance forward or backward, turning while driving forward or backward a short distance). The misaligned zone 474 surrounds (e.g., partially, completely, etc.) and is adjacent to the intermediate zone 472 and represents a range of locations where the collection arm assembly 204 or the lift assembly 300 are unable to engage the refuse container C and where the refuse container C cannot be reached without major adjustment of location of the refuse vehicle 10 (e.g., driving forward or backward a large distance, backing away from the refuse container C and realigning the refuse vehicle 10) or cannot be reached at all. In some embodiments, misaligned zone 474 covers all of the range of locations 444 except for the aligned zone 470 and the intermediate zone 472. The shapes and sizes of each zone may vary between different embodiments. By way of example, the misaligned zone 474 may be rectangular and take up only a portion of the range of locations 444.

Each zone (e.g., the aligned zone 470, the intermediate zone 472, and the misaligned zone 472) may include a range of longitudinal locations, a range of lateral locations, and/or a range of vertical locations. By way of example, the refuse container C may be longitudinally within the aligned zone 470 but laterally outside of the aligned zone 470 (e.g., laterally outward from the aligned zone 470). In such an example, even the refuse container C may be considered to be in the intermediate zone 472 and/or the misaligned zone 474. By way of another example, the refuse container C may be laterally within the aligned zone 470 but longitudinally outside of the aligned zone 470 (e.g., longitudinally forward of or behind relative to the direction of travel of the refuse vehicle 10).

In some embodiments, the controller 410 is configured to provide the relative position of the refuse container C (e.g., relative to the collection arm assembly 204, relative to the lift assembly 300, etc.) to the operator. In some embodiments, the controller 410 utilizes the display 452 to provide a graphical user interface (e.g., similar to FIGS. 7-10) that visually indicates the relative position of the refuse container C. Such a graphical user interface may update in real time. In other embodiments, the controller 410 may command the speaker 456 to provide an auditory cue that indicates the relative position of the refuse container C. By way of example, the auditory cue may be a series of discrete "beeping" noises. The controller 410 may vary the speed (e.g., the number of noises per second) or the frequency (e.g., the pitch) of the noises based on which zone contains the refuse container C. Alternatively, the controller 410 may vary the speed or frequency of the noises based on the lateral and/or longitudinal distance between the refuse container C and the aligned zone 470. In yet other embodiments, one or more of the cameras 460 are positioned to view the aligned zone 470, the intermediate zone 472, and/or the misaligned zone 474, and the display 452 provides the recorded video. One of the cameras 460 may be aligned with a lateral axis about which the collection arm assembly 204 or the lift assembly 300 extends to facilitate longitudinal alignment of the refuse container C. Any of these methods of alignment may be used alone or in combination with one another.

In other embodiments, the controller 410 is configured to analyze the relative position of the refuse container C and provide instructions to the operator to bring the refuse container C into the aligned zone 470. The instructions may be auditory (e.g., verbal instructions provided through the speaker 456) or visual (e.g., text or images provided on the display 452). By way of example, if the refuse container is longitudinally forward of the aligned zone 470, the control system 400 may instruct the operator to drive the refuse vehicle 10 forward. By way of another example, if the refuse container C is laterally outward of the aligned zone 470, the control system 400 may instruct the operator to turn the refuse vehicle 10 or exit the refuse vehicle 10 and move the refuse container C closer to the refuse vehicle 10.

The instructions provided by the control system 400 may vary depending upon the magnitude of the distance between the refuse container C and the aligned zone 470 and/or which zone contains the refuse container C. By way of example, if the refuse container C is longitudinally forward of the aligned zone 470 and in the misaligned zone 474, the instructions may include a first instruction. If the refuse container C is longitudinally forward of the aligned zone 470 and in the intermediate zone 472, the instructions may include a second instruction that instructs the operator to drive slowly to prevent overshooting the aligned zone 470.

Figure 11:
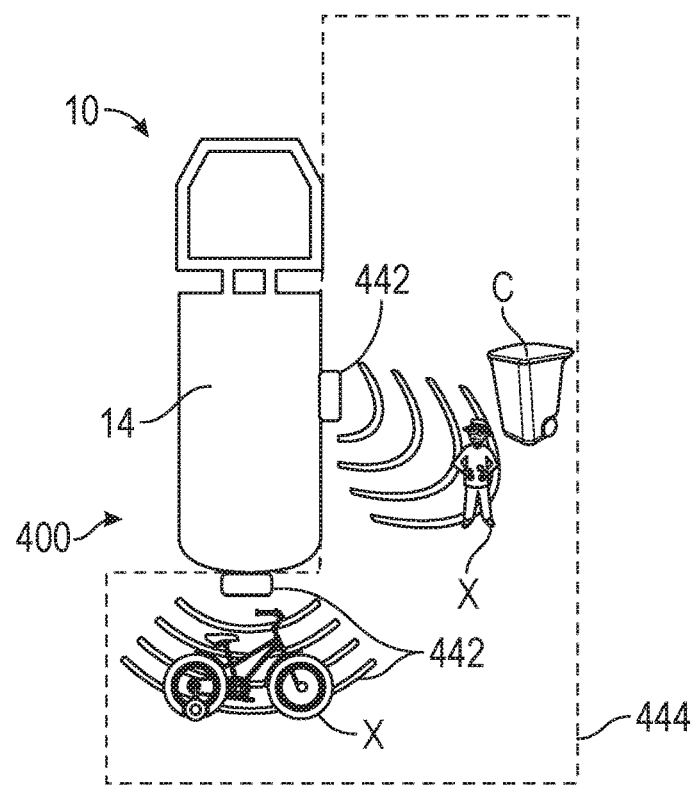
FIG. 11 is a top view of a refuse vehicle, according to an exemplary embodiment.

Referring to FIG. 11, in some embodiments, the control system 400 is configured to determine if an object detected by the object detection system 440 is a refuse container C or another type of object. In some such embodiments, once an object enters the range of locations 444, the object detection system 440 is configured to provide the locations of multiple points along the surface of object to the controller 410. The controller 410 utilizes these locations and determines a shape of the object. The controller 410 then analyzes the shape of the object and determines if the object is a refuse container C. In some embodiments, the memory 414 stores predetermined shape data corresponding to shapes of various refuse containers, and the controller 410 compares the determined shape of the object to the predetermined shape data to determine if the object is a refuse container C. In other embodiments, the object detection system 440 and/or the cameras 460 provide marking data indicating markings present on the exterior of the object. The markings may include lettering, numbering, or shapes. Alternatively, the markings may be a coating (e.g., retroreflective tape, paint, etc.) having a specific color or reflectivity. The memory 414 may store predetermined marking data corresponding to markings present on refuse containers C, and the controller 410 may compare the provided marking data to the predetermined marking data to determine if the object is a refuse container C. If the control system 400 determines that the object is not a refuse container C, the control system 400 may consider the object to be an obstacle X. Examples of obstacles X include humans, animals, bicycles, automobiles, buildings, and power lines.

If the control system 400 determines that the object is an obstacle X, it may be undesirable for any part of the refuse vehicle 10 to come into contact with the object. It may also be undesirable for certain parts of the refuse vehicle 10 to come into contact with any object (e.g., the front end, the rear end, etc.). If the control system 400 determines that there is potential undesirable contact with an object, the control system 400 may provide a warning (e.g., a sound provided through the speaker 456, a visual notification on the display 452, etc.) to the operator or disable some functionality of the refuse vehicle 10 to avoid contact with the object.

Figure 12:
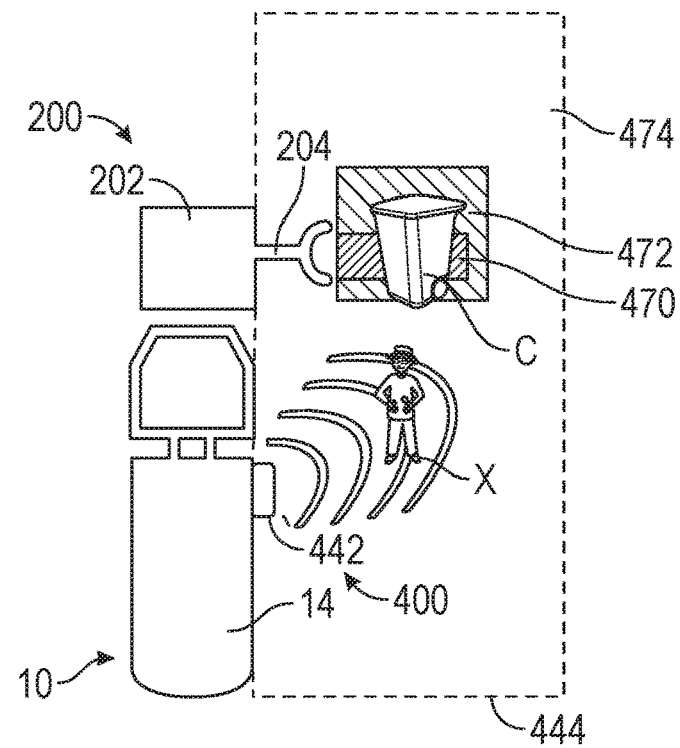
FIG. 12 is a top view of a front-loading refuse vehicle and a front-loading refuse container assembly, according to an exemplary embodiment.

In some embodiments, the control system 400 provides the warning based on the proximity of any object to a certain area of the refuse vehicle 10. By way of example, the control system 400 may warn the operator when the distance between the rear end of the refuse vehicle 10 and an object is less than a threshold distance. By way of another example, the control system 400 may warn the operator when the distance between a lateral side of the refuse vehicle and an obstacle X is less than a threshold distance. The control system 400 may detect obstacles X when assisting an operator with alignment of the collection arm assembly 204 or the lift assembly 300 with a refuse container C (e.g., as shown in FIG. 12). The control system 400 may also detect obstacles X and warn the operator even when not assisting an operator with alignment of the collection arm assembly 204 or the lift assembly 300 with a refuse container (e.g., as shown in FIG. 11).

In other embodiments, the controller 410 provides the warning based on a current state of the refuse vehicle 10. The current state of the refuse vehicle 10 may include a direction of travel of the refuse vehicle 10 or whether the collection arm assembly 204 or the lift assembly 300 are deployed. By way of example, if an object is positioned behind the refuse vehicle 10 and the refuse vehicle 10 is traveling forward, the control system 400 may not warn the operator. However, if an object is positioned behind the refuse vehicle 10 and the refuse vehicle 10 is traveling in reverse, the control system 400 may warn the operator. By way of another example, the controller 410 may determine if an obstacle X is positioned along the lateral side of the refuse vehicle 10 and if the collection arm assembly 204 or the lift assembly 300 are deployed. If the collection arm assembly 204 or the lift assembly 300 are deployed and the obstacle X is within a threshold distance of the refuse vehicle 10 such that the collection arm assembly 204 or the lift assembly 300 have the potential to contact the obstacle X, the control system 400 may warn the operator. By way of yet another example, if the obstacle X is positioned directly above the refuse vehicle 10 (e.g., a power line) or a specific part of the vehicle (e.g., the grabber assembly 306), the controller 410 may limit (e.g., disable, limit beyond a certain vertical position, etc.) raising of the lift arm actuators 44.

In some embodiments, after the refuse container C is in the aligned zone 470, the control system 400 controls the refuse vehicle 10 to autonomously (e.g., without input from an operator) engage, unload, and replace the refuse container C. The control system 400 may begin this process automatically upon confirming that an object is a refuse container C and that the refuse container C is present in the aligned zone 470. The control system 400 may begin this process in response to an operator input (e.g., through the I/O device 450). The control system 400 may begin this process in response to receiving both (a) an operator input and (b) an indication that the refuse container C is present in the aligned zone 470. Throughout this process, the controller 410 may utilize feedback from the front-loader locating system 420, the collection arm locating system 422, and/or the side-loader locating system 424 to provide feedback relating to the current position of the lift assembly 40, the collection arm assembly 204, and/or the lift assembly 300.

First, the controller 410 may determine an initial location of the refuse container C and store the initial location in the memory 414. The initial location may include a longitudinal location, a lateral location, and/or a vertical location of the refuse container C. The initial location may be determined using the object detection system 440. In the embodiments that include the collection arm assembly 204 or the lift assembly 300, the controller 410 determines a grabbing position of the collection arm assembly 204 or the lift assembly 300 in which the grabber assembly 250 or the grabber assembly 306 can successfully engage the refuse container C. The controller 410 controls the lift arm actuators 44, the articulation actuators 50, the translation actuator 234, the lift actuator 244, or the lift arm actuators 308 to move the collection arm assembly 204 or the lift assembly 300 into the grabbing position. The controller 410 then controls the grabbing actuators 254 or the grabbing actuator 324 to engage the refuse container C. In the embodiment shown in FIG. 1, the controller 410 may then control the translation actuator 234, and/or the lift actuator 244 to dump the refuse container C into the container refuse compartment 208 and return to the grabbing position. In the embodiment shown in FIG. 2, the controller 410 may control the lift arm actuators 308 to dump the refuse container C into the refuse compartment 30 and return to the grabbing position. A motion profile of at least a portion of this movement may be predetermined and stored in the memory 414.

The controller 410 is configured to automatically return the refuse container C to the initial location after the refuse container C is emptied. This prevents the refuse container C from being placed in a location that is not suitable to support the refuse container C (e.g., on the edge of a curb, on an obstacle X, etc.). The controller 410 then controls the grabbing actuators 254 or the grabbing actuator 324 to release the refuse container C. Finally, the controller 410 moves the collection arm assembly 204 or the lift assembly 300 away from the refuse container C.

In some embodiments, the control system 400 is configured to use the load sensors 430 to determine a weight of the refuse container C. When the refuse container C is lifted by the lift assembly 40, the collection arm assembly 204, or the lift assembly 300, the entire weight of the refuse container C is supported by the lift arm actuators 44, the lift actuator 244, or the lift arm actuators 308, respectively. Accordingly, the output force of each actuator and accordingly the pressure within each actuator varies based on the weight of the refuse container C. The controller 410 is configured to determine the output forces of each actuator using the load sensors 430. A relationship between these output forces and the weight of the refuse container C is predetermined and stored in the memory 414. The controller 410 uses the output forces of each actuator with this predetermined relationship to determine the weight of the refuse container C.

The relationship between the output force and the weight of the refuse container C may also vary depending on the position of the lift assembly 40, the collection arm assembly 204, or the lift assembly 300 when the output force is measured. Accordingly, the controller 410 may use information from the front-loader locating system 420, the collection arm locating system 422, or the side-loader locating system 424 to determine the position of the lift assembly 40, the collection arm assembly 204, or the lift assembly 300. The controller 410 may be configured such that the weight of the refuse container C is determined only when the lift assembly 40, the collection arm assembly 204, or the lift assembly 300 is in a target position. In other embodiments, a relationship between the position of the lift assembly 40, the collection arm assembly 204, or the lift assembly 300, the output force of each actuator, and the weight of the refuse container C is predetermined and stored in the memory 414. This relationship may be used by the controller 410 to determine the weight of the refuse container C at any position of the lift assembly 40, the collection arm assembly 204, or the lift assembly 300.

The controller 410 may determine a difference between the weight of the refuse container C before it is emptied and the weight of the refuse container after it is emptied. This difference corresponds to the weight of the refuse within the refuse container C. The controller 410 may store the weight of the refuse within the refuse container C in the memory 414. The controller 410 may additionally associate this weight with an address at which the refuse was retrieved (e.g., using a GPS) and/or a customer associated with the refuse container C. Using this information, a refuse collection company may charge a customer per pound of refuse retrieved. In this way, the cost to the customer may be based on the degree to which the customer utilizes a refuse retrieval service as opposed to a fixed cost.

Figure 14:
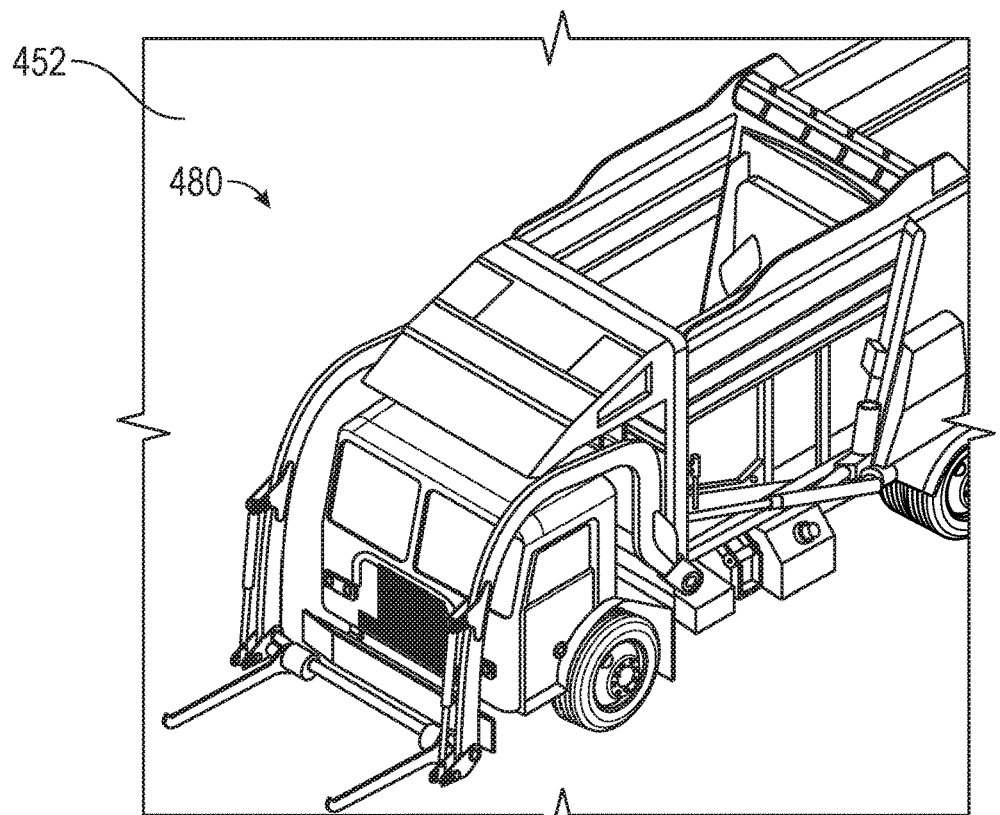
FIGS. 14-16 are screen shots of the I/O device of FIG. 13.
Figure 15:
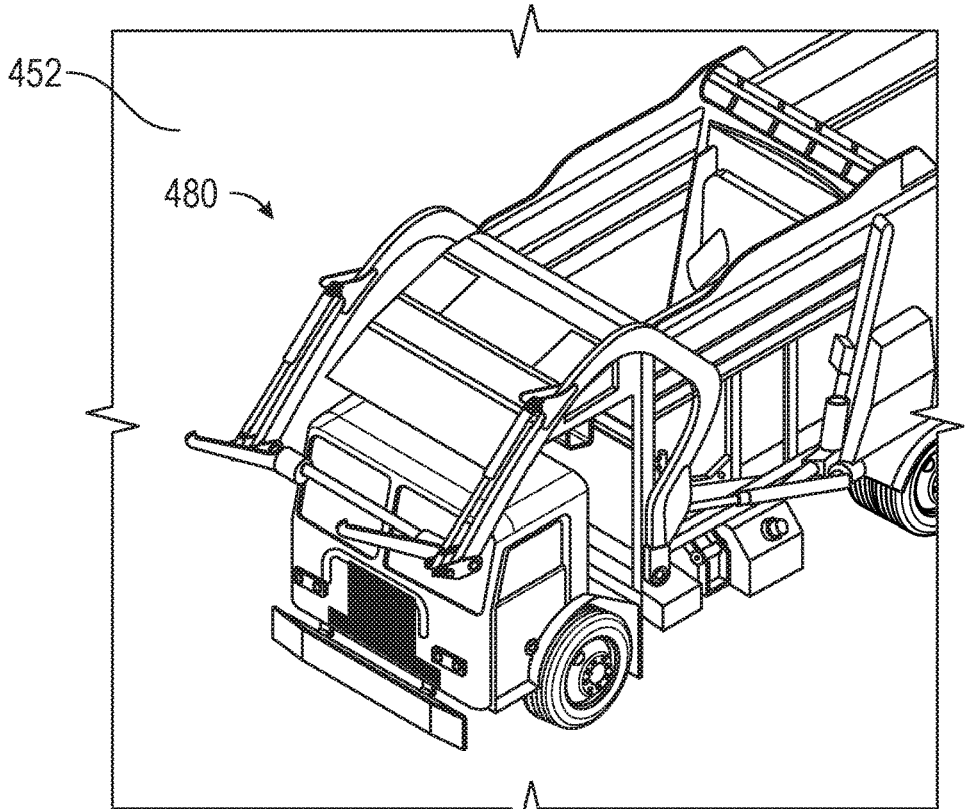

Referring to FIGS. 14 and 15, exemplary screen shots of the display 452 are shown in diagnostic mode of operation. In the diagnostic mode of operation, the controller 410 uses the front-loader locating system 420, the collection arm locating system 422, and/or the side-loader locating system 424 to determine the position of each component within the lift assembly 40, the collection arm assembly 204, and/or the lift assembly 300 relative to the body 14. The controller 410 controls the display 452 to show a graphical user interface that includes a graphic or animation, shown as three-dimensional model 480. The three-dimensional model 480 illustrates the current configuration the lift assembly 40, the collection arm assembly 204, and/or the lift assembly 300 as measured using the front-loader locating system 420, the collection arm locating system 422, and/or the side-loader locating system 424. The three-dimensional model 480 may update in real time. The relationship between the information from the front-loader locating system 420, the collection arm locating system 422, and/or the side-loader locating system 424 and the configuration of the three-dimensional model 480 may be stored in the memory 414. By way of example, the three-dimensional model 480 shown in FIG. 14 shows the lift arms 42 in a lowered position, and the three-dimensional model 480 shown in FIG. 15 shows the lift arms 42 in a raised position (e.g., offset 30 degrees from the lowered position). The operator can easily compare the three-dimensional model 480 to the actual configuration of the refuse vehicle 10 to identify potential malfunctions or improper installation of the front-loader locating system 420, the collection arm locating system 422, or the side-loader locating system 424. Conventional diagnostic screens provide only numerical or text-based data, making it far less intuitive to identify potential problems. Accordingly, the control system 400 makes problems easier to diagnose and reduces down time.

Figure 16:
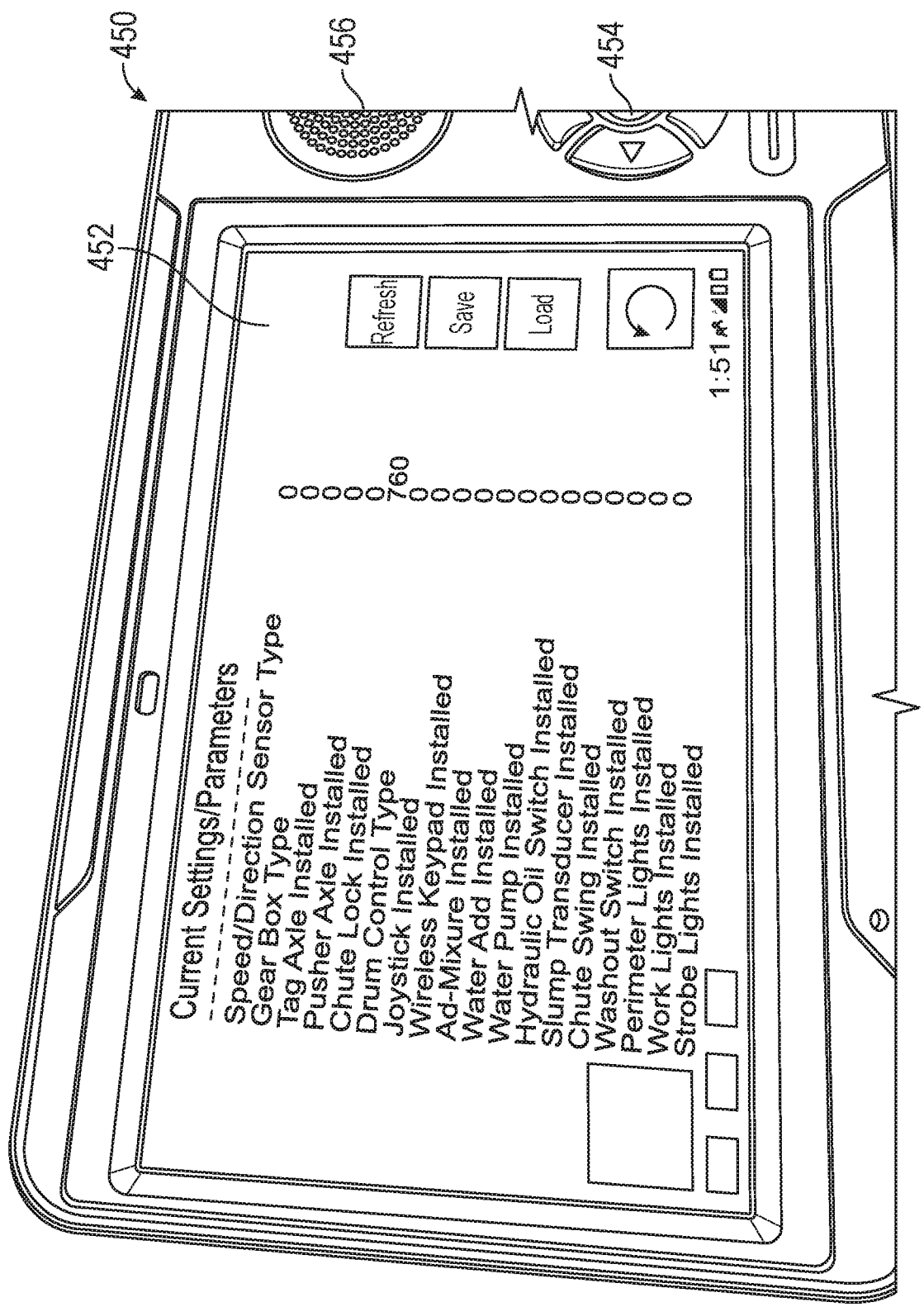

Refuse vehicle control systems commonly include hundreds of parameters that correspond to the refuse vehicle. These parameters are then used by the control system 400 to determine how to operate the refuse vehicle 10 (e.g., each parameter corresponds to a desired setting). Referring to FIG. 16, the parameters of the refuse vehicle 10 may include parameters such as whether or not certain components are installed (e.g., tag axles, pusher axles, water pumps, perimeter lights, etc.), what types of components are installed (e.g., types of gear boxes, types of sensors, etc.), and user preferences (e.g., the responsiveness of a suspension system, when doors are automatically locked, a configuration of a graphical user interface of the display 452, etc.). Conventionally, these parameters are manually updated individually during the production of the refuse vehicle 10. This can be a time consuming process and can lead to potential human error. The controller 410 is configured to receive a vehicle profile produced on an external system or device (e.g., a personal computer, another control system 400, etc.) and update the parameters in the memory 414 according to the vehicle profile, reducing the time required to configure the refuse vehicle 10. Alternatively, the I/O device 450 may be used to vary parameters and save a vehicle profile to use with other control systems 400. Additionally, multiple refuse vehicles 10 may be produced that utilize identical or similar vehicle profiles (e.g., vehicles for a specific customer). The control system 400 facilitates using the same vehicle profile across multiple refuse vehicles 10, further increasing production efficiency.

Conventionally, refuse vehicles include multiple displays within a cab: at least one display configured to facilitate control of the vehicle and a dedicated display that provides the video recorded by cameras. Referring to FIG. 13, the control system 400 includes a single I/O device 450 including a single display 452 configured to perform all of the display-based functions described herein. This reduces the space within the cab 16 required by the control system 400 and simplifies use of the refuse vehicle 10.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 as shown in the various exemplary embodiments is illustrative only. Additionally, any element disclosed in one embodiment may be incorporated or utilized with any other embodiment disclosed herein. For example, the lift assembly 300 of the exemplary embodiment shown in at least FIG. 2 may be incorporated in the refuse vehicle 10 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle, including:
    a chassis extending longitudinally;
    a body coupled to the chassis and defining a refuse compartment configured to store refuse;
    a refuse collection arm configured to engage a refuse container and lift the refuse container to unload refuse from the refuse container, the refuse collection arm including an actuator configured to control movement of the refuse collection arm;
    an object detection system configured to provide object detection data relating to locations of objects relative to the refuse vehicle;
    a display; and
    a controller operatively coupled to the object detection system, the display, and the actuator;
    wherein the controller is configured to use the object detection data to determine if the refuse container is present within an aligned zone relative to the chassis, the aligned zone representing a range of locations in which the refuse collection arm is capable of engaging the refuse container;
    wherein, in response to a determination that the refuse container has been detected by the object detection system but is not within the aligned zone, the controller is configured to control the display to provide a first indication to an operator that the refuse container is not within the aligned zone; and
    wherein, in response to a determination that the refuse container is within the aligned zone, the controller is configured to:
        control the display to provide a second indication to an operator that the refuse container is within the aligned zone; and
        control the refuse collection arm to engage the refuse container and lift the refuse container to unload the refuse from the refuse container.

2. The refuse vehicle of claim 1, wherein the range of locations of the aligned zone includes a plurality of longitudinal locations that are longitudinally offset from one another, and wherein the controller provides the first indication if the refuse container is longitudinally forward or behind the aligned zone.

3. The refuse vehicle of claim 2, wherein the range of locations of the aligned zone includes a plurality of lateral locations that are laterally offset from one another, and wherein the controller provides the first indication if the refuse container is laterally outside the aligned zone.

4. The refuse vehicle of claim 1, wherein the controller is configured to use the object detection data to determine if the refuse container is present within an intermediate zone relative to the chassis, the intermediate zone being adjacent to the aligned zone and representing a range of locations in which the refuse collection arm cannot engage the refuse container; and
    wherein, in response to a determination that the refuse container is within the intermediate zone, the controller is configured to provide a third indication to the operator that the refuse container is within the intermediate zone.

5. The refuse vehicle of claim 1, further comprising a location sensor operatively coupled to the controller and configured to provide data relating to at least one of a position and an orientation of the refuse collection arm, and wherein the controller is configured to use the data from the location sensor to autonomously control the refuse collection arm to engage the refuse container and unload the refuse from the refuse container.

6. The refuse vehicle of claim 5, wherein the controller is configured to determine an initial location of the refuse container prior to unloading the refuse from the refuse container, and wherein the controller is configured to autonomously control the refuse collection arm to return the refuse container to the initial location after unloading the refuse from the refuse container.

7. The refuse vehicle of claim 1, wherein the controller is configured to use the object detection data to determine a location of an obstacle relative to the refuse collection arm, and wherein the controller is configured to limit movement of the refuse collection arm based on a distance between the refuse collection arm and the obstacle.

8. The refuse vehicle of claim 1, further comprising a load sensor configured to provide load data related to a load supported by the refuse collection arm, and wherein the controller is configured to use the load data to determine a weight of the refuse unloaded from the refuse container.

9. The refuse vehicle of claim 8, wherein the actuator is a hydraulic actuator configured to move the refuse collection arm in response to receiving hydraulic fluid, wherein the load sensor is a pressure sensor, and wherein the load data includes a pressure of the hydraulic fluid.

10. The refuse vehicle of claim 1, wherein the refuse vehicle is a front-loading refuse vehicle, and wherein the refuse compartment of the body is a first refuse compartment, further comprising:
a container assembly coupled to the refuse collection arm and defining a second refuse compartment, wherein the refuse collection arm is configured to lift the refuse container to unload the refuse from the refuse container into the second refuse compartment of the container assembly; and
a front-loading lift assembly coupled to the chassis and at least selectively coupled to the container assembly, wherein the front-loading lift assembly is configured to lift the container assembly to unload the refuse from the second refuse compartment into the first refuse compartment of the body.

11. The refuse vehicle of claim 1, wherein the refuse vehicle is a side-loading refuse vehicle, wherein the refuse collection arm is coupled to the chassis, and wherein the refuse collection arm is configured to lift the refuse container to unload refuse from the refuse container into the refuse compartment.

12. A refuse vehicle, including:
a chassis extending longitudinally;
a body coupled to the chassis and defining a refuse compartment configured to store refuse;
a refuse collection arm configured to engage a refuse container and lift the refuse container to unload refuse from the refuse container, the refuse collection arm including an actuator configured to control movement of the refuse collection arm;
an object detection system configured to provide object detection data relating to locations of objects relative to the refuse vehicle; and
a controller operatively coupled to the object detection system and the actuator;
wherein, in response to an indication from the object detection system that an object is present near the refuse vehicle, the controller is configured to use the object detection data to determine if the object is an obstacle or a refuse container;
wherein, in response to a determination that the object is an obstacle, the controller is configured to determine if the obstacle is positioned directly above the refuse collection arm; and
wherein, in response to a determination that the obstacle is positioned directly above the refuse collection arm, the controller is configured to:
prevent upward movement of the refuse collection arm beyond a predetermined height; and
permit movement of the refuse collection arm below the predetermined height.

13. A control system for a refuse vehicle including a refuse collection arm, the control system comprising:
a location sensor configured to provide data relating to at least one of a position and an orientation of the refuse collection arm;
an actuator configured to control movement of the refuse collection arm;
a display; and
a controller operatively coupled to the location sensor, the actuator, and the display, wherein the controller is configured to use the data from the location sensor to generate a model including a simulated graphical representation of the refuse collection arm, and wherein the display is configured to display the model generated by the controller.

14. The control system of claim 13, further comprising an object detection system operatively coupled to the controller and configured to provide object detection data relating to locations of objects relative to the refuse vehicle;
wherein the controller is configured to use the display to visually indicate a location of the refuse container relative to an aligned zone, the aligned zone representing a range of locations in which the refuse collection arm is capable of engaging the refuse container.

15. The control system of claim 14, wherein, in response to an indication from the object detection system that an object is present near the refuse vehicle, the controller is configured to use the object detection data to determine if the object is an obstacle or a refuse container; and
wherein, in response to a determination that the object is an obstacle, the controller is configured to control the display to provide an indication to an operator that the obstacle is present near the refuse vehicle.

16. The control system of claim 15, further comprising a camera operatively coupled to the controller and configured to be coupled to a chassis of the refuse vehicle, wherein the camera is configured to record video of an area near the refuse vehicle, and wherein the display is configured to display the video.

17. The control system of claim 13, wherein the controller is configured to operate at least one system of the refuse vehicle according to a plurality of parameters that each correspond to a desired setting, and wherein the controller is configured to receive a profile containing the parameters from an external device.

18. The control system of claim 13, wherein the location sensor includes at least one of a linear position sensor, an angular position sensor, an accelerometer, or a gyroscopic sensor.

19. The control system of claim 13, wherein the location sensor does not include a camera.

20. The control system of claim 13, wherein the controller is configured to generate the model using the data from the location sensor and a predetermined relationship between the location data and a configuration of the simulated graphical representation.

* * * * *